Dec. 18, 1934.  H. H. DAVISON ET AL  1,984,361
PEACH PITTER
Filed March 23, 1933  3 Sheets-Sheet 1
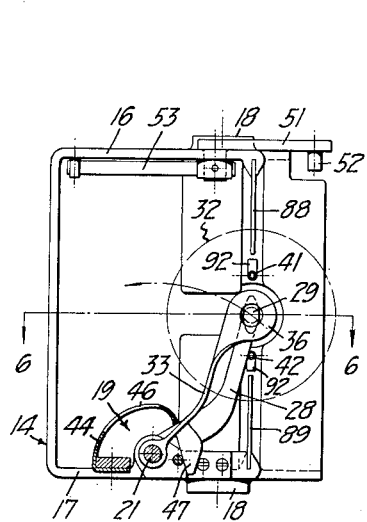
FIG. 2
FIG. 1
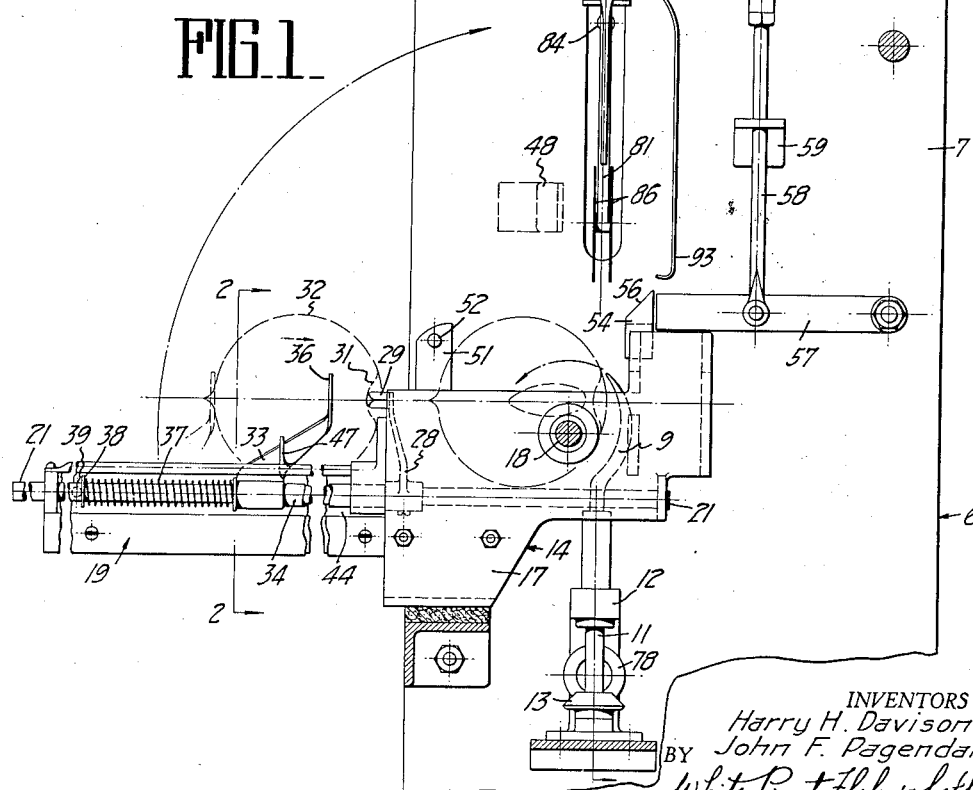
INVENTORS
Harry H. Davison
John F. Pagendarm
BY White, Prost, Fleher & Lothrop
ATTORNEYS.

Dec. 18, 1934.  H. H. DAVISON ET AL  1,984,361
PEACH PITTER
Filed March 23, 1933  3 Sheets-Sheet 2
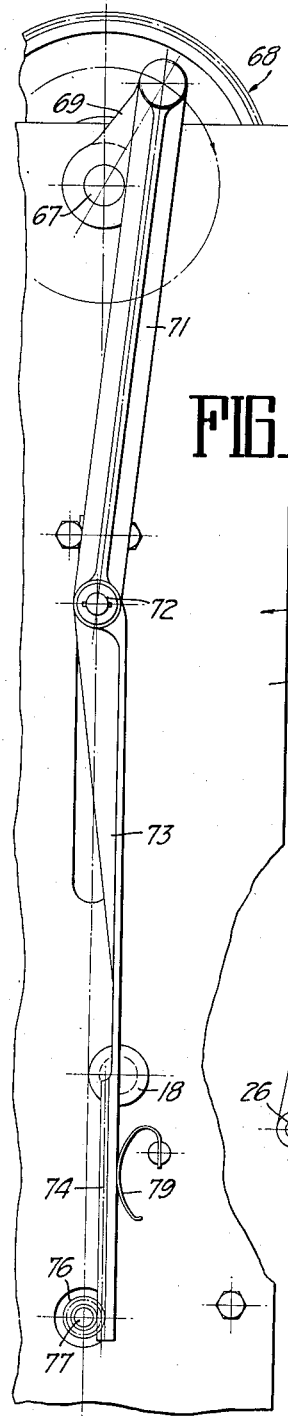
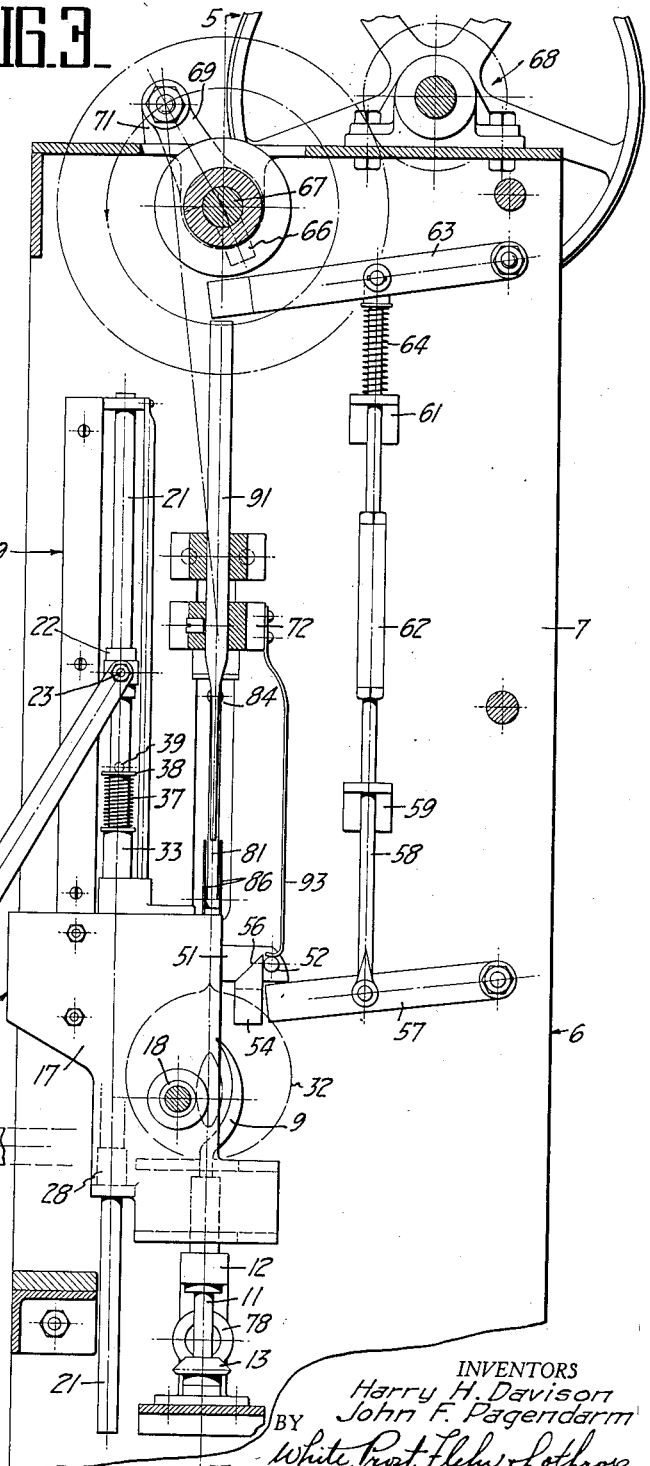
INVENTORS
Harry H. Davison
John F. Pagendarm
BY White, Prost, Hehr & Lothrop
ATTORNEYS.

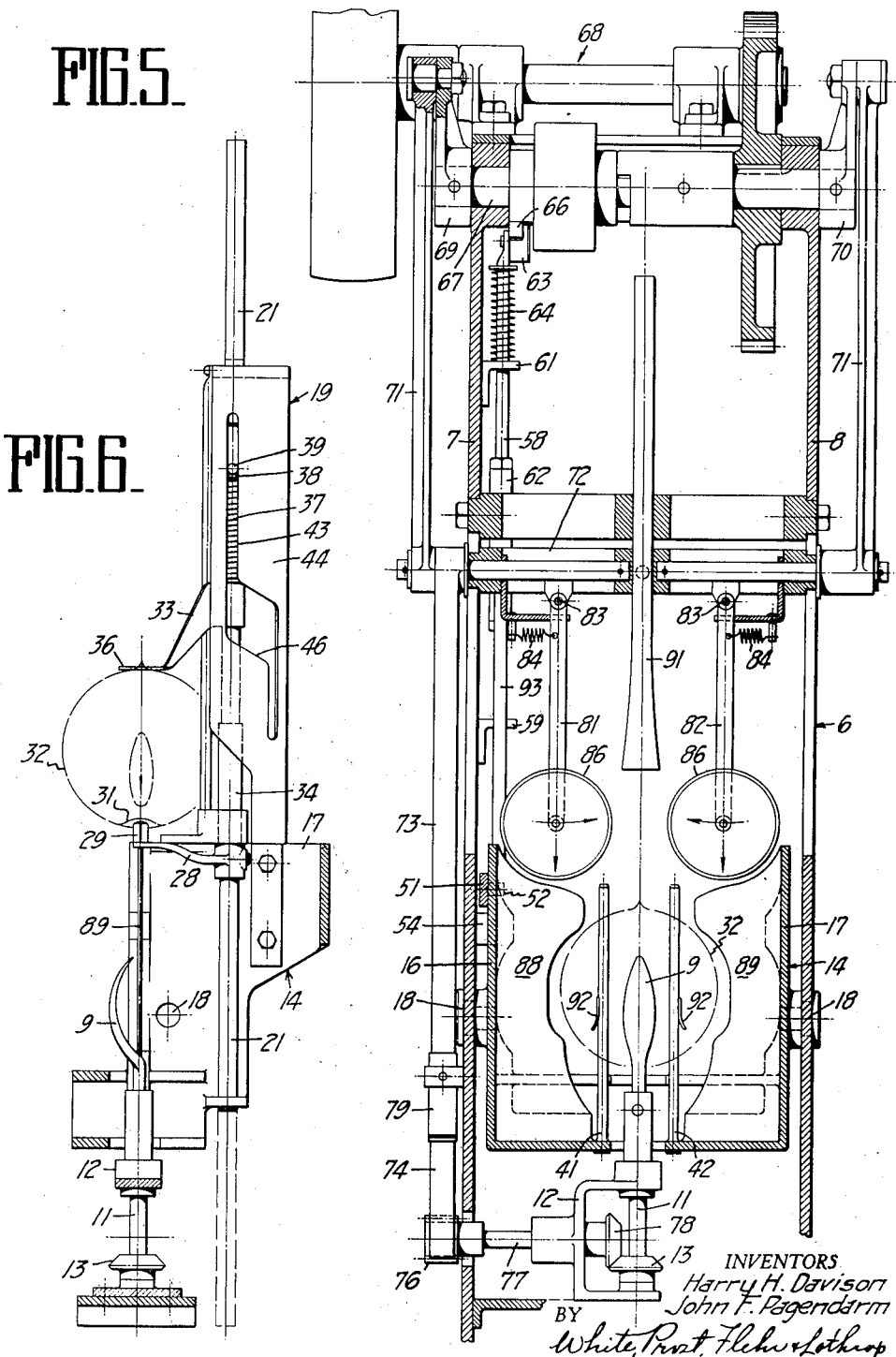

Patented Dec. 18, 1934

1,984,361

UNITED STATES PATENT OFFICE 1,984,361

PEACH PITTER

Harry H. Davison and John F. Pagendarm, San Francisco, Calif., assignors to Davison-Woods Manufacturing Co., Ltd., San Francisco, Calif., a corporation of California Application March 28, 1933, Serial No. 663,129

8 Claims. (Cl. 146—28)

Our invention relates to means for removing the stone or pit from peaches and comparable drupaceous fruits, and is of the same type of mechanism as shown in the co-pending application of Harry H. Davison entitled "Fruit pitter", filed March 12, 1932, with Serial Number 598,497.

An object of our invention is to provide a peach pitter in which the peaches are properly received in the machine and carried through a pitting operation.

Another object of our invention is to provide a peach pitter in which the peach is firmly held during the pitting operation.

A further object of our invention is to provide a peach pitter in which danger of injury to the operator is minimized.

A further object of our invention is to provide a peach pitter in which the peach is accurately located so as to provide, as nearly as possible, a perfect pitting operation.

An additional object of our invention is to provide a peach pitter which is useful with peaches of various sizes as ordinarily encountered in practice.

The foregoing and other objects are attained in the embodiment of the invention shown in the drawings, in which—

Figure 1 is a cross-section on a vertical plane with a side plate removed, showing in elevation the interior construction of our peach pitter.

Figure 2 is a cross-section the plane of which is indicated by the line 2—2 in Figure 1.

Figure 3 is a cross-section similar to Figure 1 but showing the parts in a different stage in their cycle of operation.

Figure 4 is a fragmentary view showing in side elevation part of the driving mechanism for the pitting knife.

Figure 5 is a cross-section on the line 5—5 of Figure 3.

Figure 6 is a cross-section the plane of which is indicated by the line 6—6 of Figure 2.

In its preferred form, the peach pitter of our invention comprises a frame carrying a rotatable peach-pitting knife of arcuate contour, together with a carriage pivotally mounted on the frame to move from a receiving position to a pitting position and during such movement to advance a carried peach into impaled relationship on the peach-pitting knife.

In the form of our fruit pitter shown herein, we preferably provide a frame, generally designated 6, including side plates 7 and 8. Mounted for rotation on the frame 6 is a pitting knife 9 which includes a spindle 11 suitably supported in bearings 12 and carrying a gear 13 by which the knife can be rotated. The axis of the spindle 11 is usually substantially vertical, while the pitting knife is preferably of arcuate contour and is designed to occupy a plane which contains the axis of the spindle 11.

Mounted on the frame 6 is a carriage 14, including a pair of side plates 16 and 17 each of which is provided with a pivot 18 affording an articulated connection with the frame 6. The axis of the pivots 18 is preferably transversely of the frame 6 and is arranged at right angles to the axis of the spindle 11 and in such a location that it substantially coincides with the center of arcuate curvature of the pitting blade 9, so that when the carriage 14 pivots about its transverse axis it moves in an arc which is virtually identical with the arc of the pitting knife. In accordance with our invention, we provide means for receiving and holding and advancing on the carriage 14 a peach or other fruit to be pitted, and to this end the carriage includes a structure 19 which forms a support for a slide rod 21. Carried by the slide rod is a collar 22 having a trunnion 23 thereon forming the pivot connection to a link 24. The link 24 is likewise pivoted by a pin 26 to an extension 27 of the side plate 8, so that during pivotal movement of the carriage 14 the difference in location of the pivot 18 and the pin 26 is such as to cause axial translation of the slide rod 21 in the structure 19 and with respect to the carriage 14. This arrangement is such that when the carriage occupies a substantially horizontal position, as indicated in Figure 1, the slide rod 21 is projected away from the pivot 18, while when the carriage is substantially upright, as shown in Figure 3, the slide rod 21 is in its closest approach to the pivot 18.

The movement of the slide rod 21 is utilized in advancing a peach with respect to the carriage, from receiving position into pitting position as the carriage is pivotally moved from its horizontal position to a substantially vertical position. To this end the slide rod 21 is provided with a projecting finger 28 which is secured to the rod 21 at one end and at the other end is provided with a projection 29 of approximately ovoid contour to seat within the stem-end depression 31 of a fruit such as a peach 32. The projection 29, being of suitable contour, is effective to hold the peach in a predetermined location and, since in all peaches the stem-end depression is elongated in the plane of the suture of the fruit, the suture is therefore disposed in a vertical plane or in a plane containing the major axis of the projection 29 and exposed either on the upper side of the peach or on the lower side of the peach.

In addition to the projecting finger 28, we provide a second projecting finger 33 which is associated with a tube 34 surrounding the rod 21. The finger 33 terminates in an apertured disc 36 adapted to overlie and surround the flower-end projection on the peach 32 and to assist in maintaining the peach in the proper location insofar as the suture of the peach is concerned. The disposition of the peach with its suture in a closely predetermined position is important, inasmuch as the plane of maximum pit area coincides with the external suture on the peach, so that the pitting operation is rendered feasible and greatly facilitated by arranging the peach in the described fashion when it is initially put into the machine.

To assist in the positioning of the peach as described, the finger 33 is normally pressed toward the projection 28 by a coil spring 37 which surrounds the rod 21 and is held in position by a washer 38 and a retaining pin 39. In positioning a peach, the operator, when the carriage 14 is in the position shown in Figure 1, pulls the finger 33 against the urgency of the spring 37 into the dotted line position shown in Figure 1, or beyond such position, and places the peach manually with the stem-end depression against the projection 29 and then releases the finger 33 so that the spring 37 causes the apertured disc 36 to overlie the flower-end projection and hold the peach accurately located.

When the peach is suitably received and held by the carriage, the operator moves the carriage in an arc about the pivot 18 toward the position shown in Figure 3. During such movement the link 24 is effective, through the collar 22, to translate the slide rod 21 and to move the peach longitudinally of the carriage or to advance the peach toward the pivot point 18. During such advancing movement the peach is impaled upon a pair of guide tubes 41 and 42 respectively, which are mounted on the carriage to occupy a central transverse plane in the flesh of the peach and to lie at either side of the pit thereof. The tubes 41 and 42 are preferably sharpened at their upper ends in order that a distinct cut be made in the flesh of the peach to avoid bruising thereof. When the peach has been advanced to the end of its movement on the tubes 41 and 42, the carriage is rotated about the pivots 18 into the position shown in Figure 3. During such carriage movement the fully advanced peach is rotatably engaged with the arcuate pitting knife 9, and since the peach rotates substantially about the axis of the pivot 18, and since such axis is substantially the center of curvature of the pitting knife, the pitting knife enters the flesh of the peach at the flower end and extends substantially around the pit on one side thereof, so that at the conclusion of the upward movement of the carriage 14 the peach occupies the position shown in Figure 3 with respect to the pitting knife 9.

Since, during the latter part of the movement of the carriage, the peach is firmly impaled on the tubes 41 and 42, the fingers 28 and 33 are no longer necessary to locate the peach, and we preferably provide means for removing such fingers from contact with the peach. To that end the spring-retaining pin 39 on the slide rod 21 passes through a cam aperture 43 cut in a plate 44 mounted on the structure 19. During the downward or advancing movement of the peach the pin 39 follows within the cam groove 43 until it strikes a surface 46 which causes a rotation of the slide rod 21. Such rotation of the slide rod is effective to move the finger 28 to one side and away from the peach. In order that the finger 33 may be moved to one side, the finger is provided with a projection 47 which, just before the termination of the advancing movement of the carriage 14, is adapted to contact a cam block 48 projecting from the side plate 8, so that the finger 33 is moved to one side in the same general direction as is the finger 28, and the peach is left entirely free except for its impalement on the tubes 41 and 42 and the pitting knife.

Since the peach is then accurately located on the tubes and is pierced by the pitting knife lying alongside the pit, we provide means at the termination of the advancing movement of the carriage to energize the pitting knife to effect pitting of the peach. To this end the carriage wall 16 carries a pivoted latch lever 51 which is provided with a projecting pin 52 and is normally held by a leaf spring 53 in a centralized position. As the carriage completes its advancing movement, the pin 52 engages a projection 54 extending from the side wall 7 and having an inclined leading face 56, so that the pin 52 rides over the leading face 56 and, under the urgency of the spring 53, drops behind the projection 54 and, in effect, latches the carriage in fully advanced position.

As the latch lever 51 is depressed behind the projection 54 under the urgency of the spring 53, it contacts a lever 57 which is pivoted to the side wall 7. The lever 57 transmits the resultant motion to a rod 58, passing through a pair of guides 59 and 61 and provided with a turnbuckle adjustment 62, which is pivotally joined to a lever 63 in turn pivotally mounted on the side wall 7. A coil spring 64 normally urges the levers 57 and 63 upwardly, but, under the superior urgency of the spring 53 when the latch lever 51 drops behind the block 54, the lever 63 is drawn out of engagement with a single-cycle clutch actuator 66 which is of a standard construction and which couples a drive shaft 67 to a power transmission 68 leading from any suitable source of power.

The shaft 67 then begins a complete rotation and carries with it at opposite sides of the frame 6 a pair of cranks 68 and 69 each of which is provided with a pitman 71 joined to a cross-head 72 designed for reciprocation in the side walls 7 and 8. Mounted on the cross-head is a rack arm 73 having a rack 74 adjacent its lower end adapted to mesh with a gear 76 on a cross-shaft 77 which also carries a bevel gear 78 meshing with gear 13, so that, as the shaft 67 begins to rotate, the rack arm 73 is translated and the pitting knife, through the gears 78 and 13, is rotated a complete revolution. In order to assist in maintaining engagement of the rack 74 with the gear 76, a spring shoe 79 is mounted on the frame wall 7 and bears against the reverse side of the rack.

After the pitting knife 9 has been rotated to sever the pit from the peach flesh, further downward movement of the cross-head 72 causes energization of means for cutting the flesh of the peach into two major portions. The cross-head carries a pair of drop arms 81 and 82 each of which is pivotally mounted as at 83 on a bracket extending from the cross-head and normally retracted by coil springs 84. At the lower end of each of the drop arms 81 and 82 is a pair of cutting discs 86 which are spaced apart sufficiently far to clear the drop arms 81 and 82 and likewise to span the tubes 41 and 42. As the crosshead 72 descends, the drop arms 81 and 82 descend therewith until the cutting discs 86 overlie cam plates 88 and 89 situated on the carriage side walls 16 and 17.

The cam plates are effective, first, to cause the cutting discs 86 to approach each other against the urgency of the springs 84 and slightly to overlap, and, second, to cause the cutting discs to recede from each other and follow the general contour indicated in Figure 5, so that they outline the pit as they descend and sever the flesh of the peach into two separate halves, with a small slice between the halves, thus cutting out the portion of the flesh which has been pierced by the tubes 41 and 42.

Carried by the cross-head 72 is a centrally located, depending ram 91 which is so disposed as to be effective during the final downward movement of the cross-head to dislodge the severed pit from the peach and to eject the pit from the region of the pitting knife 9. At the conclusion of the downward movement of the cross-head, an upward movement begins, and in order to prevent the central section or slice of the peach, which is impaled on the tubes 41 and 42, from rising, we preferably provide each of the tubes with a barb 92 which engages the flesh of the slice and prevents it from rising.

In substantially its lowermost position, the cross-head is effective to cause a resilient hook 93 to override the pin 52 on the latch lever 51 and, during subsequent rising movement of the cross-head and return of the parts substantially to the position shown in Figure 5, to lift the pin 52 so as to disengage the latch lever 51 from behind the block 54. When such disengagement has been effected, the carriage 14, of its own weight, falls from the position shown in Figure 3 to the position disclosed in Figure 1 which is the original position. When the shaft 67 returns to its initial position it is automatically declutched by the single-cycle clutch 66. As the carriage returns to its original position, the link 24 is effective to return the slide rod 21 to its initial location. During such return movement the finger 33 assumes its original location and the projection 28 is returned to its original position by the pin 39 travelling in the cam aperture 43, so that the parts of the machine are ready for a subsequent pitting operation.

Under certain conditions of operation it is desirable to omit the link 24 and to move the mechanism mounted on the structure 19 entirely by hand both to advance a held peach toward pitting position and to retract the mechanism after the pitting operation has been completed.

We claim:

1. A peach pitter comprising a frame, a carriage pivotally mounted on said frame, means mounted on said carriage for holding a peach, means for advancing said holding means on said carriage during pivotal movement of said carriage on said frame, and means on said frame for pitting a peach on said carriage when said carriage is in a predetermined pivotal position.

2. A peach pitter comprising a frame, a carriage mounted on said frame to pivot between two extreme positions, means mounted on said carriage for holding and advancing a peach thereon during pivotal movement of said carriage between said positions, and means on said frame for pitting said peach when said carriage is in one of said extreme positions.

3. A peach pitter comprising a frame, peach pitting means on said frame, a carriage pivotally mounted on said frame to move toward and away from said ptting means, and means mounted on said carriage for holding and advancing thereon a peach to be pitted during pivotal movement of said carriage toward said pitting means.

4. A peach pitter comprising a frame, an arcuate pitting knife on said frame, a carriage mounted on said frame to pivot in an arc concentric with the arc of said pitting knife, peach holding means on said carriage, and means for advancing said holding means on said carriage during pivotal movement of said carriage.

5. A peach pitter comprising a frame, a carriage mounted on said frame to pivot about an axis, a pitting knife on said frame having an arcuate blade concentric with said axis, and means on said carriage for holding a peach substantially concentric with said axis and close to said knife whereby said peach is rotatively impaled on said blade during pivotal movement of said carriage.

6. A peach pitter comprising a frame, a carriage mounted on said frame to pivot about a transverse axis, a pitting knife mounted on said frame to rotate about a second axis at right angles to said transverse axis, an arcuate blade on said pitting knife concentric with said transverse axis and adapted to occupy a plane containing said second axis and perpendicular to said transverse axis, and means on said carriage for holding a peach substantially concentric with said transverse axis to impale said peach on said blade during pivotal movement of said carriage.

7. A peach pitter comprising a frame, a rotatable pitting knife on said frame, a carriage mounted on said frame to pivot between a receiving position and a pitting position, peach holding means on said carriage for engaging a held peach during movement of said carriage to pitting position with said pitting knife, and means on said frame controlled by said carriage in said pitting position for rotating said pitting knife.

8. A peach pitter comprising a frame, a carriage pivotally mounted on said frame, a slide on said carriage adapted to be advanced during pivotal movement of said carriage, and a pair of gripping fingers on said slide for receiving and holding a peach in a predetermined position.

HARRY H. DAVISON.
JOHN F. PAGENDARM.